United States Patent [19]

Losi et al.

[11] Patent Number: 5,157,771
[45] Date of Patent: Oct. 20, 1992

[54] APPARATUS FOR HOT REMOVAL FROM/INSERTION TO A CONNECTION BUS OF A NON REMOVABLE MEDIA MAGNETIC RECORDING UNIT

[75] Inventors: Cesare Losi; Bruno Mattavelli, both of Milano; Giuseppe Pandolfo, Pregnana Milanese, all of Italy

[73] Assignee: Bull HN Information Systems Inc., Phoenix, Ariz.

[21] Appl. No.: 363,659

[22] Filed: Jun. 8, 1989

[30] Foreign Application Priority Data

Jun. 8, 1988 [IT] Italy .................. 20884 A/88

[51] Int. Cl.⁵ .......................................... G06F 13/00
[52] U.S. Cl. ................................. 395/325; 395/800; 364/DIG. 2; 364/946.1; 364/952.1; 364/940.2
[58] Field of Search ... 364/200 MS File, 900 MS File, 364/708, ; 395/325, 800; 361/339

[56] References Cited

U.S. PATENT DOCUMENTS

| | | | |
|---|---|---|---|
| 3,932,716 | 1/1976 | Mottel et al. | 361/339 |
| 4,454,552 | 6/1984 | Barnes et al. | 361/58 |
| 4,754,397 | 6/1988 | Varaiya et al. | 364/200 |
| 4,800,462 | 1/1989 | Zacher et al. | 364/708 |
| 4,835,737 | 5/1989 | Herrig et al. | 364/900 |
| 4,870,643 | 9/1989 | Baltman et al. | 371/11.1 |
| 4,893,210 | 1/1990 | Mintzlaff | 364/708 |
| 4,912,580 | 3/1990 | Hanson | 360/86 |
| 4,914,656 | 4/1990 | Dunphy, Jr. et al. | 371/10.2 |
| 4,937,806 | 6/1990 | Babson et al. | 364/708 |
| 5,065,262 | 11/1991 | Blackborow et al. | 360/75 |
| 5,077,722 | 12/1991 | Geist et al. | 369/75.1 |

Primary Examiner—Lawrence E. Anderson
Assistant Examiner—Richard Lee Ellis

[57] ABSTRACT

Apparatus for hot removal from/insertion to a connection bus of a non-removable-media magnetic recording unit, comprising a plurality of electromagnetic switches for isolation of the signal terminals of the unit from the bus, thereby preventing noise injection into the bus; control and timing circuits for deenergization of the unit only after opening of the switches and for enabling removal of the unit only after deenergization and circuits for imparting to the signal terminals of the unit a bias voltage intermediate or close to the electrical signal levels present on the bus, the insertion occurring by closing the switches when the unit is already powered and the terminals are biased so as to minimize the amplitude of the noise injected onto the bus.

3 Claims, 3 Drawing Sheets

APPARATUS FOR HOT REMOVAL FROM/INSERTION TO A CONNECTION BUS OF A NON REMOVABLE MEDIA MAGNETIC RECORDING UNIT

FIELD OF THE INVENTION

The present invention relates to an apparatus for "hot" removal and insertion of a non removable media magnetic recording unit from or to a connection bus.

BACKGROUND OF THE INVENTION

It is known that magnetic media mass memories currently used may be divided in two broad categories: memory devices such as disk or tape units having a removable media, and fixed media devices.

The fixed media devices are characterized, at a substantial equality in size of the device and the media, by a storage capacity an order of magnitude greater than the removable media devices and by a much greater information access speed.

As a drawback, the magnetic media cannot be removed for replacing it with media containing other information or for its storage in a protected area, such as armored cabinets and like.

This is a severe drawback for all installations where information has to be protected with the utmost security, essentially for secrecy reasons.

The removable media has two advantages for the secrecy purpose: The media may be stored in a protected environment when not used and further the access to information recorded therein is limited to the time the media is installed in the handling equipment.

The risk of abuse in information access is therefore minimized.

To achieve the advantages of intrinsic security offered by devices having removable media it is conceptually possible to implement systems where, rather than removing the recording media, it is the device containing the media which is removed. For instance this is possible in case the device is connected to the system by its own controller unit and an interface dedicated to the controlled device.

However, for cost reasons, the current trend is to use a single controller for a plurality of magnetic recording devices, by means of a common connection interface and connection bus.

The control of the several recording units occurs in "time sharing" and one unit at a time is active in the information exchange with the controller.

This does not mean that the inactive units may be disconnected from the common bus and removed. However inactive, they must guarantee to their input-/output terminals, connected to the common bus, a high impedance state in order to avoid the injection of signals on the bus and interference with the signal exchange occurring on the bus.

A partial solution is conceptually possible if the compromise is accepted of performing the removal/insertion of fixed media devices when the system is switched off or when no communication is in progress on the bus among devices and control unit and all devices are inactive.

This too is a serious constraint because it imposes on the bus the blocking of possible transfer process queues waiting to be performed on the bus and completion of the running process.

Only when the bus is inactive, as when all recording devices are inactive, may devices be removed or new devices be inserted.

The apparatus of the present invention overcomes this limitation which enables "hot" removal or insertion of a magnetic recording device on a bus, that is when operations are running on the bus, without interference with the running process.

SUMMARY OF THE INVENTION

This is achieved by means of a plurality of elements which, jointly used, perform a synergistic action for noise suppression at the connection or disconnection of the devices and which comprise:

electromagnetic switches which isolate the input-/output device terminal from the bus, biasing networks to impose a predetermined voltage level to the input/output terminals when they are disconnected and a timing logic to perform in sequence the device switching on and the closing of the switches in case of device connection and the opening of the switches followed by device switching off in case of removal.

DESCRIPTION OF THE DRAWING

These and other features of the invention and its advantages will appear more clearly from the following description of a preferred embodiment and from the enclosed drawings wherein.

DETAILED DESCRIPTION OF THE PREFERRED EMBODIMENTS

Figure 1:
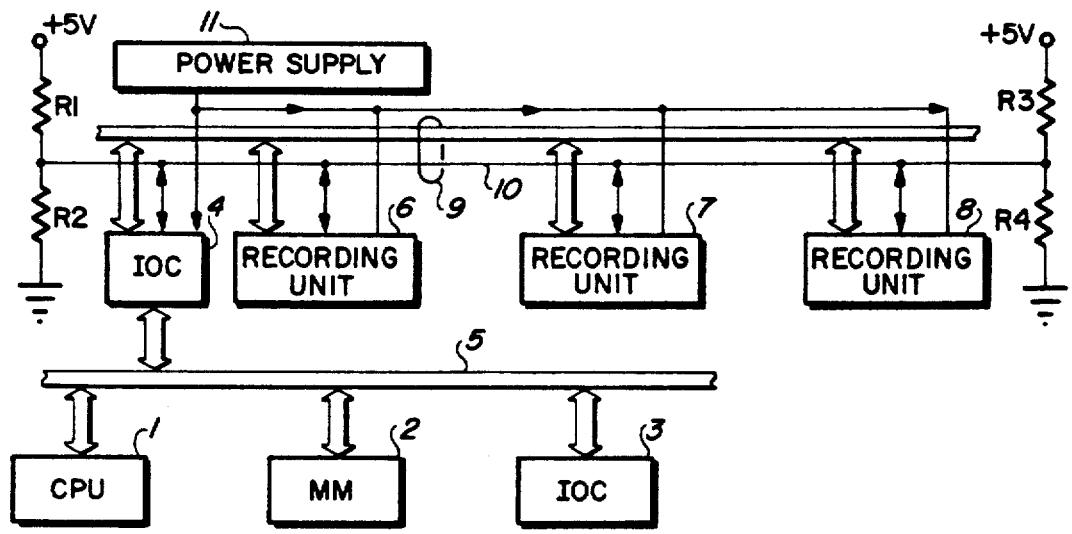
FIG. 1 shows a data processing system having a plurality of magnetic recording units or devices controlled by a control unit and connected to a common bus.

FIG. 1 shows a data processing system where a plurality of magnetic recording units having a non-removable media constitute a mass memory for the system.

The system comprises a central processing unit (or CPU) 1, a working memory 2 and a plurality of input-/output controllers (IOC) 3, 4. These components of the system communicate with each other through a system bus 5.

IOC controller 4 controls a plurality of non-removable-media magnetic recording units 6, 7, 8.

Such units, which may be disc units or tape units, communicate with controller 4 through a connection bus 9 through which signals, data and commands are exchanged.

Typically the connection bus may be of a standard type, defined by international conventions.

A bus frequently used is the one known by the acronym SCSI for Small Computer System Interface.

The specifications of such a bus, which comprises 19 signal leads plus a suitable number of ground leads, define the communications protocol and the electrical interface characteristics.

In particular, the electrical signal level may span from 2.5 to 5.25 V to indicate a non-asserted or false signal (logical 0) and from 0 to 0.4 V to indicate a true or asserted signal (logical 1).

The bus leads have a recommended impedance of 100 Ohms and in order to avoid signal reflections must be terminated with resistors which assure load impedance of the same value.

FIG. 1 shows, by way of example, that a lead 10 of bus 9 is terminated at one end with two resistors R1, R2, respectively connected to a +5V source and to ground and is terminated at the other end with two resistors R3, R4 respectively connected to a +5V source and to ground.

Resistor R1, R3 have a recommended value of 220 Ohms and resistors R2, R4 have a recommended value of 330 Ohms so as to impart a bias level of about 3V.

A system power supply 11 provides the system components with the required powering voltages.

Figure 2:
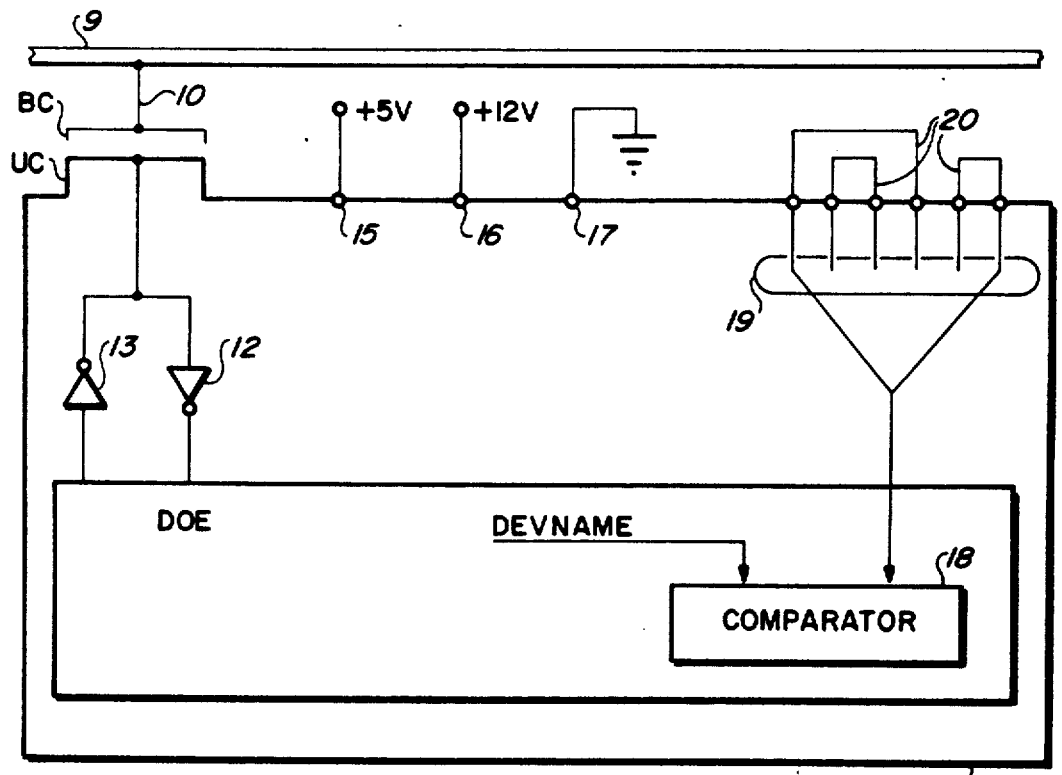
FIG. 2 (prior art) shows a conventional connection of a magnetic recording unit to a common bus.

FIG. 2 shows the "state of the art", that is, a non removable media unit, for instance unit 6, installed in the system and connected to bus 9.

Bus 9 has a connector BC with terminals connected to the several bus leads. Connector BC is coupled with a corresponding connector UC, with which unit 6 is provided.

Connector UC has terminals connected to the inputs-/outputs of a control logic unit or DOE in unit 6.

For example, bus lead 10 through connectors BC and UC is connected to an inverting receiver 12 and a driver 13.

For better understanding of the invention it is useful to point out that a receiver is characterized by a high input impedance, which however is not infinite and exhibits a capacitance on tee order of 5 pF towards ground.

Likewise a driver, which may be of the tristate type or of the open collector type, if properly powered and controlled to be in high impedance state, exhibits an output capacitance, towards ground, of about 20 pF.

If not properly powered, its behavior is unpredictable and looks like an impedance having some indeterminate value or as a limit like a ground short.

Power to the circuits and devices of unit 6 is provided by a power supply 11 (FIG. 1) through connection terminals 15, 16, 17.

Through such terminals a voltage of +5V for logic circuit power, a voltage of +12 V for energization of power devices (motors, actuators and so on) and a ground return are for instance provided.

Typical of several communication busses, SCSI included, is a mechanism for selecting one among the several units, which is used by the I/0 controller.

The controller drives the bus by applying a binary signal code or DEVNAME which is received by all the units connected to the bus. Each unit compares the DEVNAME code with its own name, that is with a binary code specific to each unit. If and only if the two codes coincide it responds to the controller call, starting a dialog which may include the acceptance of commands and their execution, the forwarding of signals and the transfer of data.

Therefore each unit such as 6 comprises a comparator 18 and a set of accessible terminals 19 which may be variably connected to each other, by means of straps 20, to provide a set of signals or a binary code which constitutes the name of the unit and which is compared with the DEVNAME received from I/0 controller.

In a system as the one of FIG. 1, the several units 6, 7, 8 will obviously have different names from one other.

From the previous considerations related to the electrical status of the signal input/output of the units, it follows that upon powering up the system a signal uncertainty status occurs, which must be masked.

It is well known that at the start-up, all the logical activities are inhibited by a reset signal, which may be generated by one or more system components.

Only when start-up is completed, once the initial electrical status is certainly defined, the reset signal is removed to enable the logical processes.

It is therefore clear that when the system is switched off it is possible to perform the removal and the insertion of components such as units 6, 7, 8 (and it will be the task of CPU1, by means of suitable programs, to establish which are the components and the units effectively present, that is the system configuration, when the system is switched on and initialized), and when the system is powered up and logically active the removal-/insertion of a unit is not possible without interfering with the running processes.

With reference to FIG. 2, assumption is made that in order to render feasible the insertion/removal of unit 6 from the system, powering terminals 15, 16, 17 are replaced with a pair of connectors such as BC and UC, (or possibly the same connectors BC and UC are used for the powering of the unit).

If the unit 6 is switched off preliminary to disconnection of the UC connector from the BC connector, the status of interface elements such as 13 becomes unknown and noise may be injected on the bus in form of signal attenuation, or in the extreme case, of forcing signals to ground.

If the unit 6 is not switched off and the UC connector is disconnected from BC connector, there is no certainty that the severing of the various terminals occur simultaneously and the previously considered problem is still present, with the further worsening that the power terminals, closed on the load of the powered device, may be subject to electrical arcs which damage them and hamper their operability.

The same problems occur when inserting a unit, with a further complication: even assuming that the unit is powered up and the status of the drivers such as 13 is at high impedance, the driver outputs and the receiver inputs act as capacitors whose charge status and corresponding voltage level cannot be predicted in a unitary and systematic way.

The insertion of this capacitance on the bus, through the connector pair BC, UC may therefore impart spikes to the signals present on the bus.

These signals may temporarily exceed the variability margins allowed for a correct correlation among electrical and logical levels, giving rise to errors.

If the spike occurs in coincidence with a signal transition and such transition is effective for the triggering of electronic components such as flip flops, Schmitt triggers, univibrators, the signal rising or falling edge may be modified and take the form of a hook comprising three subsequent edges having alternatively opposite slope.

This may result in double triggering of the electronic components and the consequent generation of possible errors.

The present invention overcomes all these problems and makes feasible the hot disconnection/connection (with an active bus) of magnetic recording units by means of a simple, reliable, inexpensive apparatus, safe and practical to use.

Figure 3:
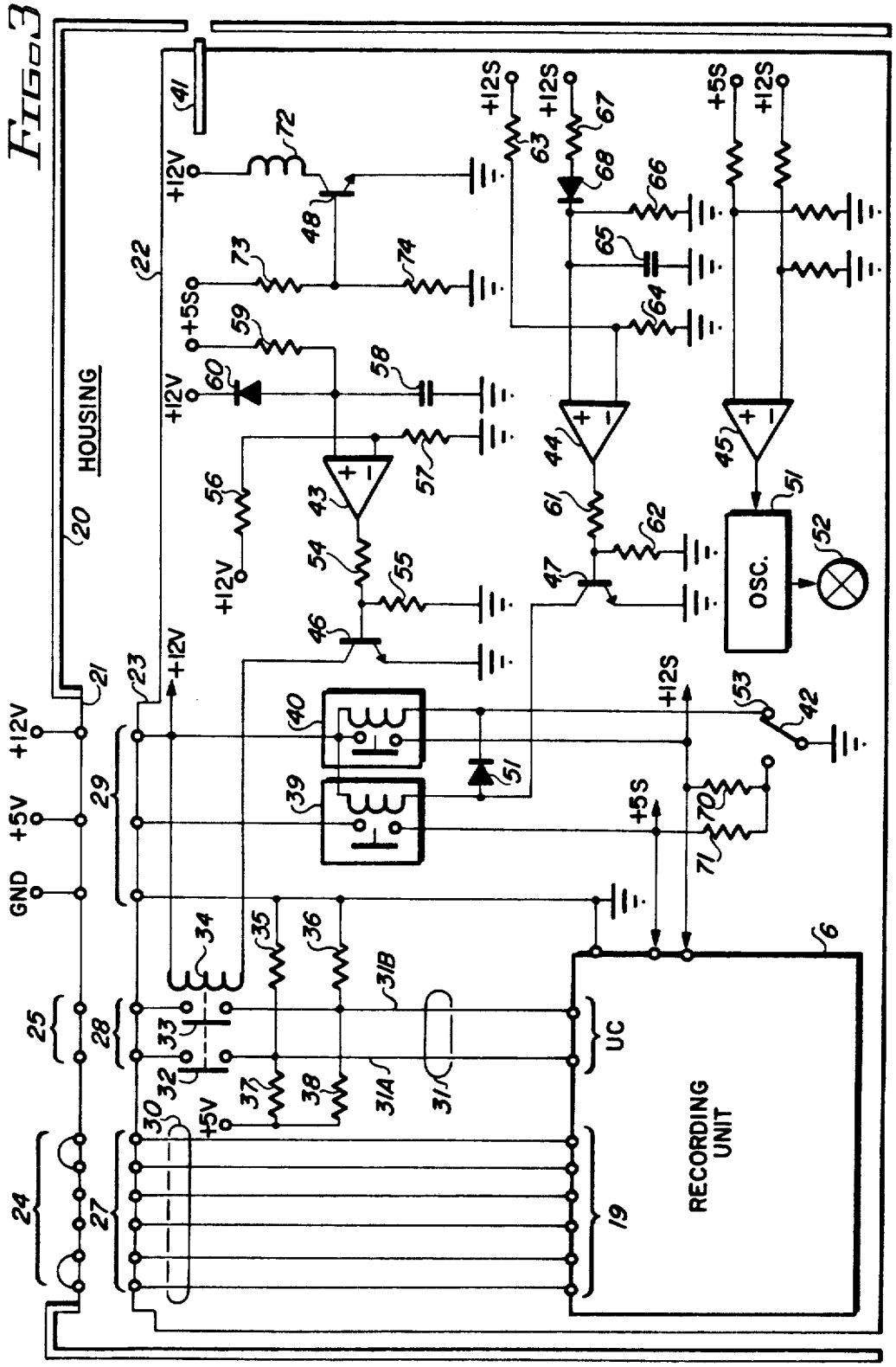
FIG. 3 shows a preferred form of embodiment of an apparatus for hot removal from/insertion to a bus of a fixed media magnetic recording unit.

This apparatus is shown in FIG. 3.

The apparatus comprises a housing, shown schematically by line 20, open on the front, having a rear wall with a pluggable connector 21 and a protection box 22 for the recording unit (such as 6) and the other elements which will be considered in the following.

The protection box 20 is removably inserted in housing 20.

Box 20 is provided with a connector 23 for a coupling with connector 21.

Connector 21 has a first set of terminals 24, a second terminal set 25 connected to the bus and a third set 26 connected to powering voltages and ground.

For instance in set 26 one terminal GND is grounded, a second terminal is connected to a +5V power source and a third terminal is connected to +12V.

Connector 23 has a corresponding first, second and third terminal set 27, 28, 29 respectively.

Container 22 provides a housing for unit 6 and for suitable electrical circuits and electromechanical devices, namely:

Direct electrical connections 30 between terminal set 27 and terminal set 19 of unit 6.

electrical connections 31 between terminal set 28 and terminals of connector UC of unit 6, each connection being performed through an electromagnetic control switch.

For clarity FIG. 3 shows two connections only, 31A, 31B respectively controlled by switches 32, 33, normally open, closed when a control winding 34 is energized.

The connection sections comprised between switches 32, 33 and connector UC are grounded through resistors, respectively 35, 36 having a high resistance value, on the order of 30-50 KOhm. They are further connected to voltage +5V (received from terminal 29) through resistors 37, 38 respectively.

Resistors 37, 38 have a high resistance value too, in the order of 50-100 KOhm.

Container 23 further provides housing for two electromagnetic switches 39, 40, an electromechanical interlock 41, a two-position, switching on/off switch 42 and logic circuits for control, timing and signaling, essentially comprising three comparators 43, 44, 45, three transistors 46, 47, 48 an oscillator 51, a lamp display or LED 52 and a suitable number of resistors, diodes and capacitors.

Voltage +12V received through connector 23 is directly used for the powering of such circuits.

It is further input to switch 40 which outputs, when closed, a voltage +12, applied to a powering input of unit 6 and distributed to the control circuits as a control signal.

Likewise voltage +5V received through connector 23 is to switch 39 which, when closed, outputs a voltage +5 S, applied to a powering input of unit 6 and distributed as a control signal to the control circuits.

Voltage +12V is supplied to an input of energization winding of switches 39, 40. The winding output of switch 39 is connected, through a diode 51 to the winding output of switch 40. This output is connected to a terminal 53 of switch 42.

When switch 42 is in powering position(ON), terminal 53 is grounded.

Energization of switches 39, 40 causes their switching on and the availability of voltages +5 S, +12 S, hence the powering up of unit 6 and the control of the drivers (as 13) status.

Winding 34 has a terminal fed by voltage +12V and the other terminal connected to the collector of transistor 46 having grounded emitter.

The base of transistor 46 is connected to the output of comparator 43 through a limiting resistor 54 and to ground, through a resistor 55.

Comparator 43 receives a reference voltage at the inverting input.

The reference voltage, on the order of 2-3V is obtained from voltage +12V through a voltage divider consisting of resistors 56, 57.

The direct input is connected to the output of an RC network formed by capacitor 58 and resistor 59.

It is further connected to the anode of diode 60, whose cathode is connected to voltage source +12 S.

Resistor 59 is biased by voltage +5 S.

Absent voltage +5 S, comparator 43 outputs a signal substantially at zero electrical level, because the inverting input is at a potential higher than the one of the direct input.

As a consequence transistor 46 is non conductive, winding 34 is deenergized and switches 32, 33 are open.

When, at switching on, voltage +5 S becomes available, capacitor 58 is charged and with a delay which depends on the time constant of the circuit, the voltage at the direct input of comparator 43 exceeds the voltage at the inverting input.

Comparator 43 then raises the electrical level at the output and switches on transistor 46, causing the energization of winding 34 and the closing of switches 32, 33.

Therefore the connection of the inputs/outputs of unit 6 to the connection bus is performed when the unit is already powered up and the outputs are definitely in high impedance state.

In addition the capacity of the inputs/outputs is charged owing to the biasing resistor, at a voltage level intermediate to the two possible signal levels present on the bus leads (+3V, 0V) so that the noise introduced on the bus leads is attenuated and can be tolerated.

Further in case the noise injected on the bus occurs in coincidence with a signal transition on the bus lead, at the intermediate voltage level, on the order of 2V which is the level corresponding to the triggering of devices activated by signal transitions, the charge level of the input/output capacity, owing to their biasing, is substantially at the same level and the noise is substantially zeroed.

The operation of the apparatus may now be considered in connection with the switching off.

The output terminal of switch 39 energization winding is connected to the collector of transistor 46, emitter grounded. The base of transistor 47 is connected, through resistor 61, to the output of comparator 44.

It is further connected to ground, through a resistor 62.

Comparator 44 has the inverting input supplied with a reference voltage, for instance 4V, obtained from a voltage divider consisting in resistors 63, 64 series connected between voltage +12V and ground.

The direct input is connected to ground through a capacitor 65 and a resistor 66.

It further receives voltage +12 S through a resistor 67 and a diode 68, in series connection, the diode being conductive from the +12 S voltage towards the direct input.

It can be immediately seen that when the apparatus is switched off but is inserted in the housing 20 (voltage +12V being present) the output of comparator 44 is at electrical level 0 and transistor 46 is non-conductive.

Once the apparatus is switched on, and voltage +12 S becomes available, capacitor 65 is charged to a voltage level defined by voltage divider 67, 66 and chosen to be higher than 4V.

Therefore, with some delay as to the switching on time, comparator 44 raises the electrical level at its output and switches on transistor 47.

When the apparatus is switched off, by toggling control switch 42 on terminal 69, switch 40 is opened and voltage +12 S is removed.

Switch 39 remains closed, because the energization current may flow in transistor 47 which is conductive, and voltage +5 S is still present.

The powering line at +12 S is grounded by resistor 70 so as to discharge possible capacitance connected thereto.

The removal of +12 S voltage has two effects: First it causes, through diode 60, the toggling of comparator 43 and the switching off of transistor 46.

As a consequence, winding 34 is deenergized and switches 32, 33 are open.

Therefore the connection terminals of unit 6 are isolated from the bus when unit 6 is still powered up and do not cause noise injection in the bus.

Second, by removing the +12 S voltage, the charge on capacitor 65 is no longer sustained. Therefore, after a delay which depends on the time constant of the circuit comprising capacitor 65 and resistor 66, capacitor 65 is discharged and transistor 47, controlled by comparator 44, is switched off causing deenergization of switch 39 and removal of +5 S voltage.

The lead providing voltage +5 S is suitably grounded through a resistor 71.

Comparator 45, which receives signals +5 S, +12 S as input voltages, through suitable voltage dividers, controls an oscillator 51 or directly a display 52, which is active for the whole time period in which voltage +5 S is present and voltage +12 S missing.

For the whole time interval in which the display is active, the operator who has actuated switch 42 for switching off the apparatus, is informed that the switch-off sequence is still running.

When the switch-off sequence is concluded, container 22 may be withdrawn from its housing.

The power consumption of the control circuits which are still powered is negligible and limited to the power drained by comparators 43, 44, 45 and related biasing circuits.

A protection to prevent inadvertent withdrawal of the container from its housing is provided by a lock device 41.

A winding 72 energized by voltage +12V and grounded through transistor 48 causes the actuation of the lock device 41.

Transistor 38 is powered by voltage +5 S through a base bias circuit consisting of resistors 73, 74.

Transistor 48 is switched off at switch off sequence completed and only at that time is the locking device deactivated.

It has to be noted that service voltage +12 S must be removed about 30 sec. in advance relative to removal of the other voltages and the removal of the unit to assure that the movable magnetic media (the disk) is at rest when the unit removal operation is performed.

Otherwise, possible gyroscopic torques resulting from removal could cause damages to the media spindle.

It must be further noticed that the recording unit remains "anonymous" until it is installed in one of the possible housings.

A name is attributed to the unit by connector 21 of the housing 20.

Terminals 24 of connector 21 are suitably interconnected by straps to provide the unit name. In fact, it must be remembered that once the units are removable, the number of units which may be installed in the system at different times may be greater than the number of the names which may be assigned.

To avoid the case of units having the same name being simultaneously present in the system, as might result in a system having at least two housings for receiving removable units, it is advantageous to give a name to the units, which name depends only on the insertion housing.

Therefore the name is assigned to the housings, not to the units.

The preceding description, made with reference to FIG. 3, relates to a preferred form of embodiment only and several modifications are possible.

In FIG. 3, all the auxiliary circuits which make removability possible are housed in the removable container for two reasons: First the electromechanical devices are more subject to failure than electronic devices and have a shorter useful life. Their allocation in the removable unit enables easier maintenance and in case of failure there is no need to put the system out of service.

In fact it suffices to replace the defective unit with an operating one.

Second, depending on the user need, if removability is not required, the recording units may be continuously mounted in the system, by directly connecting a unit to each of the connectors as 21, without any constructional change in the system.

It is however clear, that the circuits of the apparatus may be rendered in whole or in part integral to the system, without affecting the individual cost of the removable units.

Figure 4:
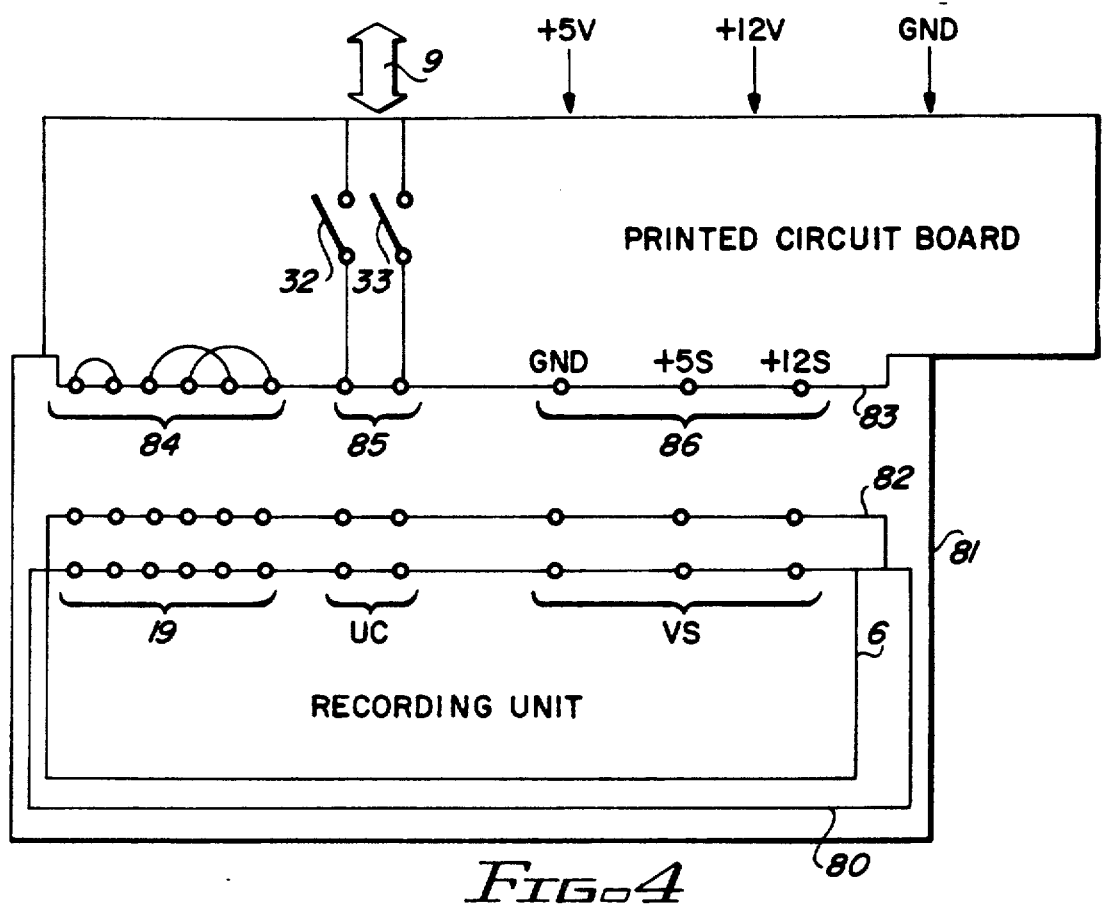
FIG. 4 shows in schematics an alternative embodiment of the apparatus of FIG. 3.

This approach is shown in FIG. 4.

In FIG. 4, unit 6, protected by container 80, is inserted in a system housing 81.

Terminals 19, UC, and VS of unit 6 are connected to corresponding terminals of a connector 82 which couples with a connector 83 of the housing.

The connector 83 terminals are arranged in three sets, 84, 85, 86.

Set 84 is provided with personalization straps. Set 85 is connected to the bus through switches 32, 33 and set 86 is connected to the service voltage +5 S, +12 S generated by the auxiliary circuits already described with reference to FIG. 3.

These circuits may be implemented on a printed circuit board 87 which is made part of the system and which is connected, preferably by connectors, to the connection bus and to power leads.

The only elements of the apparatus which preferably, for mechanical rigidity and ease of access, are not mounted on board 87 are clearly the control switch, the display and the lock mechanism (Devices 42, 52, 41 of FIG. 3).

These devices will be preferably mounted on a rigid front panel contiguous to housing 81.

Even the biasing circuits for the unit terminals, intended for connection to the bus, may be subject to changes.

Figure 5:
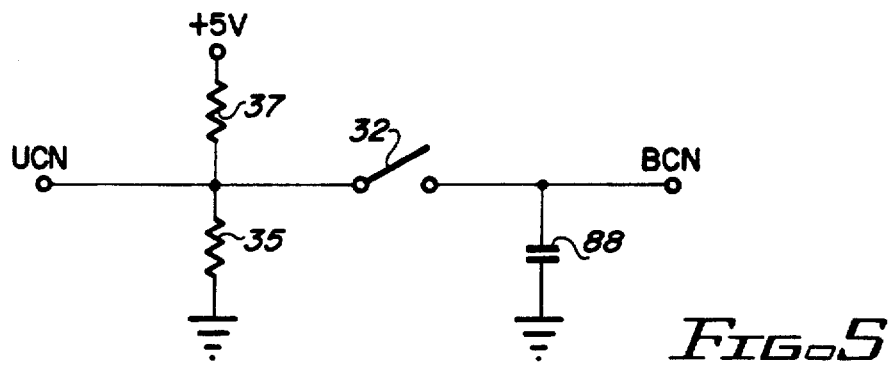
FIGS. 5 and 6 shows two variants of biasing circuits for the apparatuses of FIG. 3 and FIG. 4.

FIG. 5, which is limited for clarity to a terminal only, shows a possible improvement.

Unit terminal UCN is biased by resistors 35, 37 respectively connected to ground and to a +5V voltage and is connected to a bus terminal BCN through switch 32.

A capacitor 88 having capacitance in the order of 100 pF is connected between terminal BCN and ground and provides additional noise damping without causing any substantial degradation of the signal transitions propagating on the bus.

Figure 6:
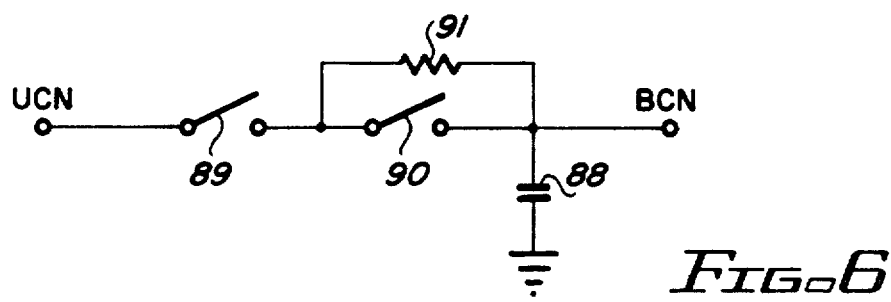

FIG. 6 shows a variant of the biasing circuit which, although more costly, imparts to the unit terminals a bias which changes in accordance with the effective electrical level on the bus lead.

In FIG. 6 the unit terminal UCN is connected to the bus terminal BCN through two switches 89, 90 series connected.

A resistor 91, with resistance on the order of 100 Ohms, is parallel connected to switch 90, which in turn is connected to BCN.

A capacitor 88 may be connected between terminal BCN and ground.

Switches 89, 90 are closed and opened in a suitable sequence.

In order to remove a unit, switch 89 is open before removing the powering voltage +5 S to the unit. Switch 90 may be open, before simultaneously with or after switch 89 at will.

In order to insert a unit on the bus, the two switches must be preliminarily open.

Once the unit is powered by voltage +5 S and possible shorts are prevented at the driver outputs, switch 89 is closed.

In this way the capacitance of the unit terminals is charged, through resistor 91, at the variable voltage level present on the bus lead causing a negligible noise which is damped by the RC filter formed by the intrinsic capacitance, the resistor 91 and possibly by capacitor 88.

Once the terminal biasing has been performed, switch 90 is closed and provides signal transfer without any attenuation.

In order to avoid attenuation it must be noted that switches as 32, 33 (FIG. 3, 5) and 89, 90 (FIG. 6) must have a negligible resistance when closed.

Therefore the use of mechanical contact switches is advisable for this purpose.

What is claimed is:

1. Apparatus for hot removal from/insertion to a connection bus of a non-removable media magnetic recording unit, a plurality of magnetic recording units being connected to said connection bus through connectors, comprising:
   a housing having a first connector with a first set of housing terminals connected to said bus, a second set of housing terminals connected to voltage sources and a third set of housing terminals selectively connected together by straps,
   a container removably inserted in said housing and having a second connector for coupling with said first connector, said second connector having a first, a second and a third set of container terminals corresponding to the housing sets respectively for coupling with said first, second and third set of terminals of said first connector, said container containing a) a recording unit having a first set of unit terminals intended for connection to said bus, a second set of unit terminals intended for connection to voltage source and a third set of unit terminals for unit identification by means of straps selectively connecting said unit identification terminals in said third unit terminal set, and b) direct electrical connection of said third unit terminal set to said third container terminal set of said second connector,
   means in said container for electrically connecting said first terminal set of said unit to said first set of housing terminals, through said second connector of said container and a set of switches, each of said switches controlling the electrical connection of a terminal in said first set of unit terminals to a terminal in said first set of container terminals.
   electrical bias means for said first set of unit terminals, operative to apply a predetermined voltage to said first set of unit terminals when said container is inserted in said housing and said recording unit is unpowered, and
   control and timing means in said container, operative when said container is housed in said housing, for activation of said recording unit by first connecting said second set of unit terminals to at least a powering voltage source, through said second set of container terminals and said second set of housing terminals and by second closing said plurality of switches, and for deactivation of said unit by first opening said plurality of switches and by second disconnecting said second set of unit terminals from at least one of said voltage sources, for subsequent removal of said container from said housing.

2. Apparatus as claimed in claim 1 where said switches are electromagnetic switches and said bias means consists, for each terminal of said first set of unit terminals, of a voltage divider connected to said each terminal and between a powering voltage and ground to impart to said first set of unit terminals an intermediate voltage, said intermediate voltage having a level which is between two possible extreme voltage levels present on said bus.

3. Apparatus as claimed in claim 1 comprising further, in said container, mechanical lock means controlled by said control and timing means to prevent removal of said container from said housing during the whole time said unit is powered by at least one of said voltage sources.

* * * * *